A. O. MORSE.
BABY CARRIAGE.
APPLICATION FILED SEPT. 8, 1910.
997,466.
Patented July 11, 1911.
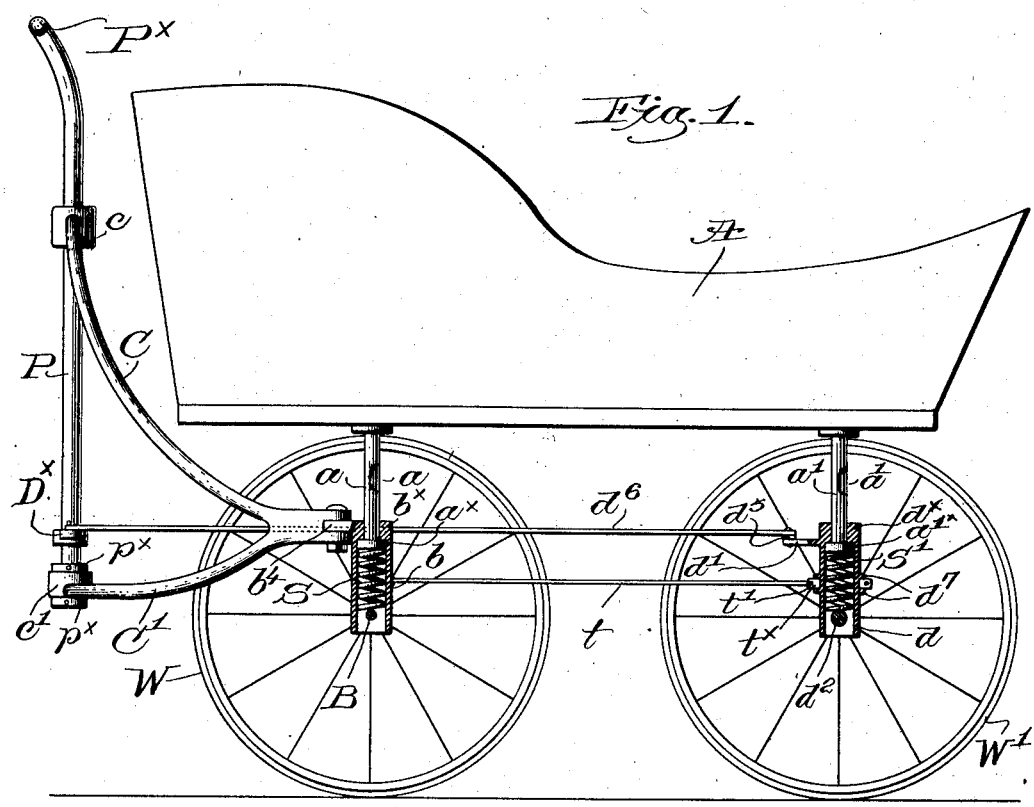
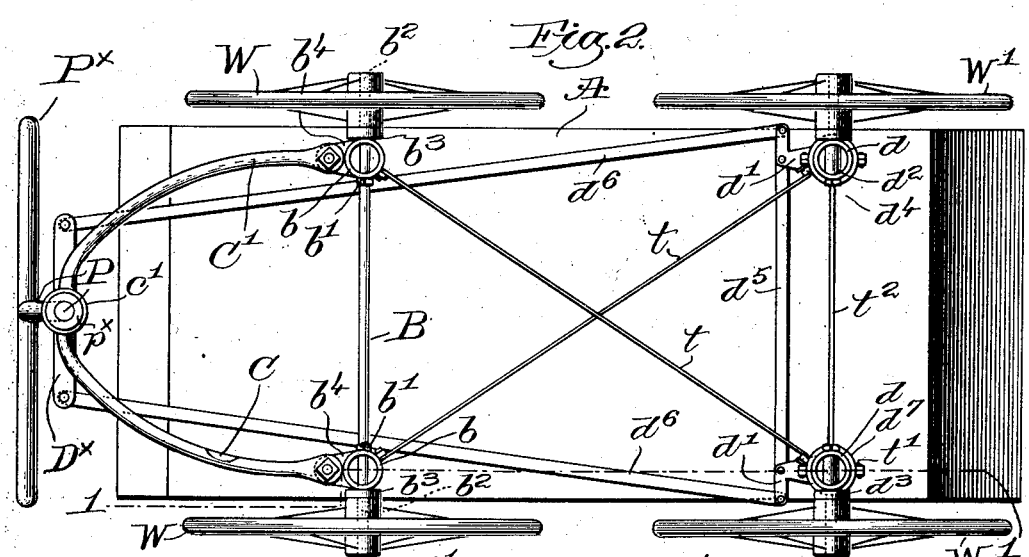
Witnesses.
Thomas J. Drummond
Fred S. Greenley
Inventor.
Albert O. Morse,
by Kerly & Guyny Att'ys.

UNITED STATES PATENT OFFICE.

ALBERT O. MORSE, OF LEOMINSTER, MASSACHUSETTS, ASSIGNOR OF ONE-HALF TO CHIPMAN V. WRIGHT, OF LEOMINSTER, MASSACHUSETTS.

BABY-CARRIAGE.

997,466. Specification of Letters Patent. Patented July 11, 1911.

Application filed September 8, 1910. Serial No. 581,056.

*To all whom it may concern:*

Be it known that I, ALBERT O. MORSE, a citizen of the United States, and resident of Leominster, county of Worcester, State of Massachusetts, have invented an Improvement in Baby-Carriages, of which the following description, in connection with the accompanying drawing, is a specification, like characters on the drawing representing like parts.

This invention has for its object the production of a novel baby carriage of simple and efficient construction, whereby the carriage can be readily guided to the right or left by the person propelling it, without the necessity of lifting the front wheels from the ground, pavement, or other supporting surface.

I have also provided a novel construction and arrangement of spring connection between the wheels and the body of the carriage, whereby a smoother and better support for the body is provided, lessening the shock or jar when the wheels pass over inequalities or small obstructions in the ground or other surface traversed.

The various novel features of my invention will be fully described in the subjoined specification and particularly pointed out in the following claim.

Figure 1 is a side elevation and part vertical section of a baby carriage embodying one practical form of my invention, taken on the irregular section line 1—1, Fig. 2; Fig. 2 is an under plan view of the baby carriage; Fig. 3 is a front view, centrally broken out, of the rotatively movable carriers for the front wheels, said carriers also constituting spring cases.

In the present embodiment of my invention the body A of the carriage, of any suitable shape and construction, has rigidly attached to the bottom four depending and parallel plungers, $a$ and $a'$, the plungers $a$ being located opposite each other near the back of the body and the plungers $a'$ are similarly arranged near its front. The plungers $a$ slide in bearings formed by the thickened upper ends $b^\times$ of upright, tubular carriers $b$, through the lower ends of which carriers is extended an axle B, fixed in position by check nuts $b'$, Fig. 2, and terminating at its ends in suitable spindles $b^2$ for the hubs of the rear wheels W. A collar $b^3$ on the axle at the inner end of each spindle is interposed between the carrier and the hub of the wheel W. Within each carrier $b$, between the axle extended through it and a head $a^\times$ on the plunger $a$ projecting through the bearing $b^\times$ is interposed a coiled supporting spring S, which spring provides a yielding connection between the rear axle and the body A, as will be manifest.

To assemble the parts the plungers are passed through the bearings $b^\times$ and the heads $a^\times$ are screwed on or otherwise attached, the springs are inserted, and then the axle B is set in place with the springs S under slight compression.

Rearwardly extended ears $b^4$ on the carriers $b$ have rigidly bolted to them a bracket-frame comprising a rearwardly and upwardly extended U-shaped branch C and a lower rearwardly extended and similarly shaped branch C′, Figs. 1 and 2, said branches having bearings $c$, $c'$ located one above the other in alinement, for the reception of a push-bar P. Said push-bar has at its upper end a cross-bar or handle P$^\times$ at a convenient height to be grasped by the hands of the person propelling the carriage, the push-bar being rotatably mounted in the bearings $c$, $c'$ and it is held from longitudinal movement by collars $p^\times$.

In practice the collars $b^3$ will be screwed onto the axle after the latter has been passed through the carriers, the construction illustrated providing a strong lateral bracing for the rear pair of carriers $b$, and additional bracing is provided by the bracket-frame C, C′, as will be apparent. Inasmuch as the carriers $b$ have no rotative movement, being held therefrom by axle B, it follows that the rear wheels W will always travel in upright, parallel planes at right angles to said axle.

Baby carriages are frequently made with the front wheels mounted to travel in fixed planes, parallel to the planes of travel of the rear wheels, so that in guiding the carriage the front wheels must be lifted clear of the ground, or they must be caused to drag sidewise in one direction or the other, making it hard to guide the carriage and tending to unduly shake or jar the occupant. In my present invention I have overcome this objectionable feature by so mounting the front wheels that their spindles can be swung about vertical pivotal points, to cause the wheels to be swung bodily to the right or left as desired, such swinging or guiding movement being controlled by the push-bar. The carriers $d$ for the front plungers $a'$ are made tubular, as before, with thickened upper ends $d^\times$ to form bearings for the plungers, but each carrier has a rigid arm $d'$ extended rearwardly therefrom, and constituting, with the adjacent wheel spindle $d^2$ a species of bell-crank.

As best shown in Fig. 3 each spindle has a circular shoulder $d^3$ which abuts against the lower part of the carrier, the spindle being extended through the carrier and held securely thereupon by a nut $d^4$. Each plunger $a'$ has an attached head $a^{1\times}$, Fig. 1, which slides up and down in the carrier, and a coiled spring $S'$ is interposed between such head and the part of the wheel-spindle $d^2$ extended through the lower part of the carrier. As the plungers $a'$ are fixedly attached to the carriage body A it will be apparent that the carriers $d$ can rotate about the said plungers as vertical axes, while the plungers can move vertically with relation to the carriers, the springs $S'$ yieldingly supporting such plungers.

The front wheels $W'$ are rotatably mounted on the spindles $d^2$ in usual manner, and as the arms $d'$ are connected by a pivotally attached cross-bar $d^5$ it will be manifest that the arms must be swung simultaneously in one direction or the other to thereby swing the spindles and the wheels mounted thereon. Said cross-bar $d^5$ is pivoted to each arm $d'$, Fig. 2, and one extremity of each of the arms $d'$ is pivotally connected by a link $d^6$ with the corresponding end of a steering yoke $D^\times$ fast on the push-bar P, the links converging toward the yoke, as shown clearly in Fig. 2.

When it is desired to turn the carriage in one direction or the other the push-bar is turned in its bearings $c$, $c'$ to swing the yoke $D^\times$ and thereby exert a pull on one link $d^6$ and impart a thrust to the other, so that the two bell-cranks $d^2$, $d'$ will be turned in the same direction about the plungers $a'$, to thereby swing the wheels $W'$ in upright planes to the right or left, as the case may be, and causing the carriage to travel in the desired direction. The mounting of the front wheels to swing as described does not in any way interfere with the function of the springs $S'$ to yieldingly support the front end of the carriage body, as will be apparent.

By using coiled springs I am able to obtain greater resiliency for the carriage body, longer life for the springs, and a more compact and durable construction than can be secured with the ordinary elliptic or other form of leaf spring now commonly employed in vehicles of this character.

I prefer to brace the carriers $d$ by means of diagonal tie-rods $t$, $t$, Fig. 2, the rear ends of said rods being attached to suitable ears on the carriers $b$, while their front ends are attached to separable collars $t^\times$ loosely surrounding the front carriers $d$ between annular flanges $d^7$ thereon, the collars being held together by suitable bolts $t'$. A transverse rod $t^2$ rigidly connects said collars and serves as a distance member to maintain the front carriers $d$ always spaced the proper distance apart while the tie-rods $t$ serve to position the carriers $d$ with relation to the rear carriers $b$, and obviate any tendency of the carriers to twist or pull out of proper axial relationship to their coöperating plungers. The plungers fit with sufficient freedom in the bearing portions of the carriers to avoid binding and to rise and fall as may be required during the progress of the carriage, each point of support of the body having its own sustaining spring.

Having fully described my invention, what I claim as new and desire to secure by Letters Patent is:

In a baby carriage, a body, rigidly attached, depending plungers thereon, a tubular carrier in which each plunger is slidably mounted, coiled springs in the carriers to yieldingly support the plungers, a spindle fixedly attached to and laterally extended from each carrier, a wheel rotatably mounted on each spindle, means to prevent rotative movement of the rear pair of carriers, and manually controlled means, including a push-bar at the back of the body, to turn the front carriers on their plungers as axes and thereby swing the front wheels to right or left, combined with a distance-rod between the front pair of carriers, and braces between the front and rear carriers.

In testimony whereof, I have signed my name to this specification, in the presence of two subscribing witnesses.

<div style="text-align:right">ALBERT O. MORSE.</div>

Witnesses:
CHIPMAN V. WRIGHT,
RALPH W. ROBBINS.